(12) United States Patent
Welch et al.

(10) Patent No.: US 10,668,606 B2
(45) Date of Patent: Jun. 2, 2020

(54) KEY LOCKED INSERT INSTALLATION TOOL

(71) Applicant: United Technologies Corporation, Farmington, CT (US)

(72) Inventors: Derek T. Welch, Marlborough, CT (US); Ricky D. Tucker, Pipe Creek, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 184 days.

(21) Appl. No.: 15/841,968

(22) Filed: Dec. 14, 2017

(65) Prior Publication Data

US 2019/0184535 A1    Jun. 20, 2019

(51) Int. Cl.
*B25B 28/00* (2006.01)
*F16B 37/12* (2006.01)
*B25D 9/06* (2006.01)
*B25B 31/00* (2006.01)
*B25B 27/14* (2006.01)

(52) U.S. Cl.
CPC ............ *B25B 28/00* (2013.01); *B25B 27/143* (2013.01); *B25B 31/00* (2013.01); *B25D 9/06* (2013.01); *F16B 37/125* (2013.01); *B25D 2222/21* (2013.01); *B25D 2250/181* (2013.01); *F16B 37/122* (2013.01)

(58) Field of Classification Search
CPC ..... B25B 28/00; B25B 27/143; F16B 37/125; F16B 37/122; B25D 9/06; B25D 2222/21; B25D 2250/181; Y10T 29/49718; Y10T 29/49721; Y10T 29/49732; Y10T 29/49735; Y10T 29/49739; Y10T 29/49741; Y10T 29/49744; Y10T 29/49233; Y10T 29/49318

USPC ............. 29/888.011, 889.1, 402.01, 402.09, 29/402.11, 402.12, 402.14, 402.15, 29/402.17

See application file for complete search history.

(56) References Cited

U.S. PATENT DOCUMENTS 2,858,601 A * 11/1958 Cummaro ............. B25B 27/143
29/240
3,388,621 A * 6/1968 Neuschotz ............ B25B 27/143
29/283.5

(Continued)

FOREIGN PATENT DOCUMENTS

FR          2087924 A5    12/1971

OTHER PUBLICATIONS

European Search Report dated Apr. 26, 2019 for European Patent Application No. 18200118.0.

(Continued)

*Primary Examiner* — Sarang Afzali
*Assistant Examiner* — Darrell C Ford
(74) *Attorney, Agent, or Firm* — Bachman & LaPointe, P.C.

(57) ABSTRACT

In a method for installing a key locked insert to a workpiece, the workpiece has a hole open to a first surface. The method includes: threading an insert body into the hole; threading a first portion of a mandrel into the insert body; after the threading of the first portion into the insert body, mating a second portion of the mandrel with an actuator; and using the actuator to extend an anvil relative to the mandrel to drive keys of the insert through a thread of the workpiece hole.

20 Claims, 7 Drawing Sheets

(56) References Cited

U.S. PATENT DOCUMENTS

| | | | | |
|---|---|---|---|---|
| 3,394,448 | A | * | 7/1968 | Neuschotz ............ B25B 27/143 |
| | | | | 29/281.3 |
| 4,172,314 | A | | 10/1979 | Berecz et al. |
| 4,752,996 | A | | 6/1988 | Berecz et al. |
| 5,040,277 | A | * | 8/1991 | Dessouky ............. B25B 21/001 |
| | | | | 29/240 |
| 5,617,623 | A | * | 4/1997 | Schron, Sr. ........... B25B 27/143 |
| | | | | 29/240 |
| 6,704,985 | B1 | | 3/2004 | Marshall |
| 2007/0245533 | A1 | * | 10/2007 | Szewc .................. B25B 27/143 |
| | | | | 29/240.5 |
| 2008/0104814 | A1 | | 5/2008 | Buchanan et al. |
| 2011/0148051 | A1 | | 6/2011 | Cousin et al. |
| 2016/0333919 | A1 | * | 11/2016 | Sharp .................... F16B 37/125 |
| 2017/0203423 | A1 | | 7/2017 | Scholz |

OTHER PUBLICATIONS

Keenserts Inserts Installation, Removal & Broach, Nov. 9, 2006, Alcoa Fastening Systems, Pittsburgh, Pennsylvania.
Power Installation Tools, Sep. 21, 2009, Alcoa Fastening Systems, Pittsburgh, Pennsylvania.
Power Micro Air Hydraulic Riveter, Aug. 31, 2006, Blue Pneumatic, Whittier, California.

* cited by examiner

KEY LOCKED INSERT INSTALLATION TOOL

U.S. GOVERNMENT RIGHTS

This invention was made with Government support under contract N00019-15-C-0004 awarded by the United States Navy. The Government has certain rights in this invention.

BACKGROUND

The disclosure relates to key locked inserts. More particularly, the disclosure relates to tools for installing key locked inserts.

Key locked inserts are commonly used broadly in industry to provide a replaceable threaded attachment point (typically to a metal workpiece). A particular situation is in gas turbine engines (broadly including turbofans, turbojets, turboprops, turboshafts, and industrial gas turbines), typically to attach external components to case pieces of the engine (e.g., pipe hangers, accessories, and the like).

Figure 6:
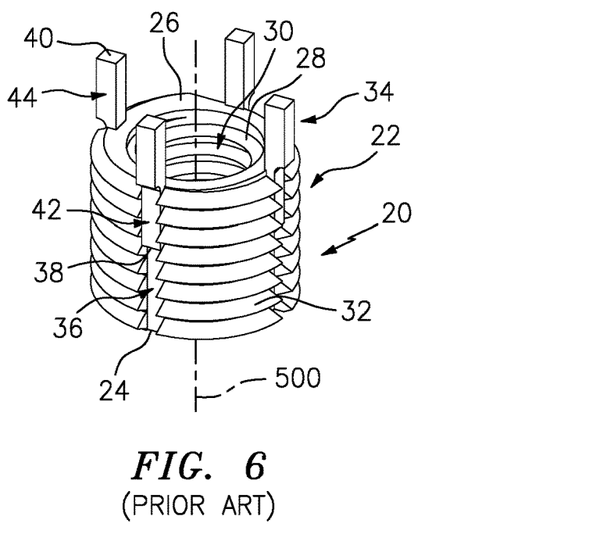
FIG. 6 is a pre-use view of a key locked insert.

A key locked insert (insert) 20 (FIG. 6) comprises a bushing or body 22 extending along a central longitudinal axis 500 from a first end or rim 24 to a second end or rim 26. The body 22 has an inner diameter (ID) thread (internal thread) 28 along a central passageway 30 and an outer diameter (OD) thread 32 along a periphery. Keys (wedges) 34 are fitted in respective axial grooves or slots 36 cut into the OD thread 32. Typically, smaller diameter or lighter duty inserts have two diametrically opposed keys while larger or heavier duty inserts have four evenly spaced keys. The keys 34 each extend from a proximal (viewed relative to the body) end 38 to a distal end 40. The keys 34 each have a radially protuberant portion 44 near the distal end 40 and a radially narrower portion 42 near the proximal end 38. Prior to use, the keys 34 are in an extended condition (FIG. 6) with the protuberant portion 44 protruding beyond the second end 26.

Figure 7:
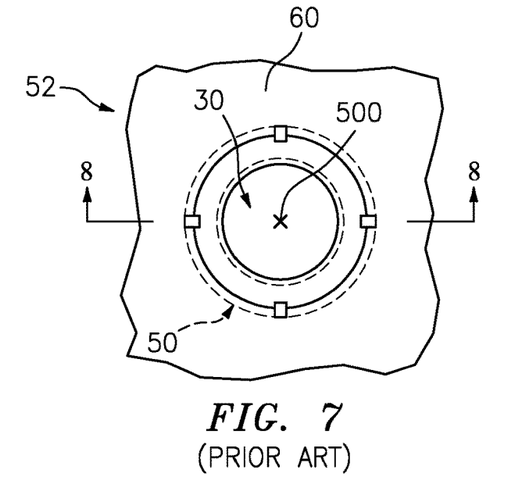
FIG. 7 is an end view of the insert installed in a workpiece.
Figure 8:
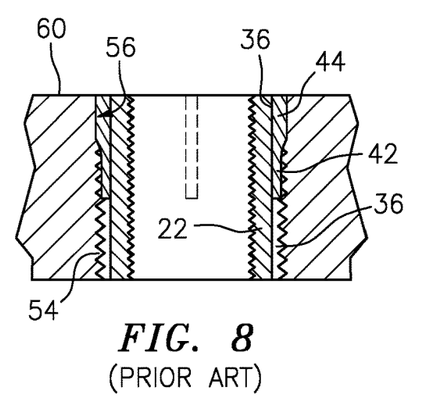
FIG. 8 is a central longitudinal sectional view of the insert and workpiece taken along line 8-8 of FIG. 7.

In use, a user threads the insert body 22 into a complementary internally-threaded hole 50 (FIG. 7) in a workpiece 52 (e.g., a metal workpiece such as a gas turbine engine case segment) via the OD thread 32. The threading may place the second end 26 flush or slightly sub-flush to the adjacent face 60 of the workpiece. The user then drives the keys 34 axially through the workpiece's ID thread 54 (FIG. 8—with the protuberant portions 44 creating broached slots 56). The interfitting of the keys 34 with the slots 36 and 56 serves as an anti-rotation feature for the body 22.

In engine service, the internal thread 28 of the insert 20 may be damaged. Sometimes, the insert 20 may be replaced. For example, the insert 20 may be removed by first drilling the insert 20 with a drill of slightly smaller diameter than the troughs of the insert's OD thread 32 and just far enough axially to sufficiently weaken the body 22 material adjacent to the protuberant portions 44 of the keys 34. Then, the user knocks the keys 34 out of the slots broached 56 (e.g., radially inward with a punch and hammer) and unscrews the insert body 22 from the workpiece 52 (e.g., using a screw extractor tool).

Figure 9:
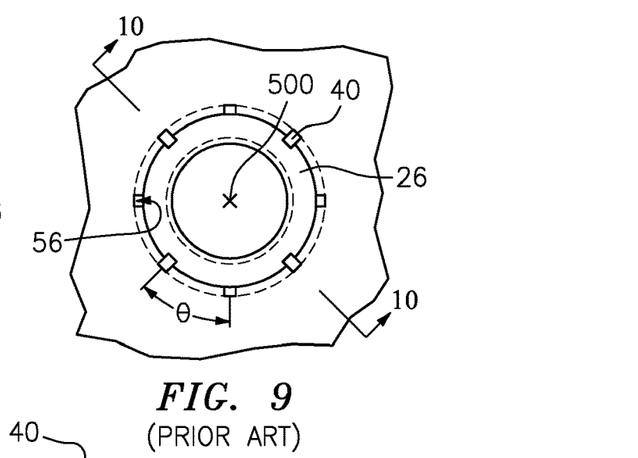
FIG. 9 is an end view of a replacement insert threaded into the workpiece before key driving.
Figure 10:
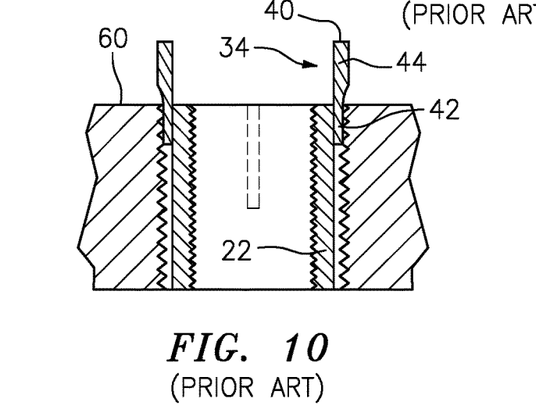
FIG. 10 is a central vertical sectional view of the workpiece and replacement insert along line 10-10 of FIG. 9.

A new insert 20 may be installed either using the broached slots 56 from the prior insert (if they are in good condition) or creating new broached slots angularly offset from the prior ones by an angle θ (FIG. 9; the clocking position or angle—see discussion below). The number of times an insert 20 can be replaced is limited to the number and condition of existing broach slots 56 and the specified θ. FIGS. 9 and 10 show the keys 34 before driving.

Alternatively to reusing the prior threaded hole 50 in the workpiece, the hole can be bored out to then next incremental available diameter and tap threaded. A new insert may be installed that has an OD thread 32 complementary to the ID thread 54 of the newly bored and threaded hole but having the same ID thread as the prior insert. This may be a necessity when there is no remaining available space for new broached slots 56.

To aid in insert installation, two general types of installation tools exist: manual and pneumatic. U.S. Pat. No. 6,704,985, to Marshall, Mar. 16, 2004, and entitled "Threaded tool insert", discloses a manual tool. U.S. Pat. No. 4,752,996, to Berecz et al., Jun. 28, 1988, and entitled "Insert installation tool", discloses a pneumatic tool.

In exemplary manual tools, the keys 34 are driven via hammer striking force on the distal ends 40 (e.g., with the tool intervening between the hammer and the keys). Prior to said driving, the user may rotate the insert 20 to the desired orientation. The desired orientation may be at existing, serviceable, broached slots 56 or at a predetermined angle θ (in both directions) from unserviceable broached slots (e.g., a repair specification may specify an angle that has been calculated based on workpiece material, insert diameter, broached slot width, and the like). Manual tools risk deforming or breaking keys due to factors such as variations in hammer striking force magnitude and direction and improper support for the workpiece, causing key deflection and improper installation. This risk increases with the material hardness of the workpiece.

Exemplary pneumatic tools have a mandrel that threads into an uninstalled insert. The tool then automatically threads the insert into the workpiece and immediately thereafter drives the keys by pneumatic actuation. One advantage of this is the tool's exerted forces are well aligned and counteracted because the tool is threaded into the insert and thus the workpiece. A disadvantage is the angular position of the keys about the hole axis cannot be controlled. As a practical matter, this limits use of the pneumatic tool to situations where no broach slots are present (e.g., at original equipment manufacture (OEM) or for a newly oversized hole).

SUMMARY

One aspect of the disclosure involves a method for installing a key locked insert to a workpiece. The workpiece has a hole open to a first surface. The method comprises: threading an insert body into the hole; threading a first portion of a mandrel into the insert body; after the threading of the first portion into the insert body, mating a second portion of the mandrel with an actuator; and using the actuator to extend an anvil relative to the mandrel to drive keys of the insert through a thread of the workpiece hole.

A further embodiment of any of the foregoing embodiments may additionally and/or alternatively include the insert having exactly two or exactly four said keys.

A further embodiment of any of the foregoing embodiments may additionally and/or alternatively include the driving of the keys creating slots through the thread of the workpiece hole.

A further embodiment of any of the foregoing embodiments may additionally and/or alternatively include the threading of the insert body into the hole being before the threading of the first portion into the insert body.

A further embodiment of any of the foregoing embodiments may additionally and/or alternatively include the actuator being a pneumatic actuator.

A further embodiment of any of the foregoing embodiments may additionally and/or alternatively include the threading comprising registering the keys with existing slots through the thread of the workpiece hole.

A further embodiment of any of the foregoing embodiments may additionally and/or alternatively include the threading comprising locating the keys away from existing slots through the thread of the workpiece hole.

A further embodiment of any of the foregoing embodiments may additionally and/or alternatively include the mating of the second portion of the mandrel with the actuator comprising shifting a release sleeve against a spring bias to radially free locking members.

A further embodiment of any of the foregoing embodiments may additionally and/or alternatively include removing a prior keyed insert from the workpiece hole.

Another aspect of the disclosure involves an apparatus comprising: a nosepiece having an anvil; a mandrel passing through the anvil and having: a threaded first portion; and a second portion; and an actuator having a releasable coupler receiving the second portion. The actuator is actuatable to axially shift the mandrel relative to the anvil. The mandrel is releasable from the coupler without removing the nosepiece from the actuator.

A further embodiment of any of the foregoing embodiments may additionally and/or alternatively include the actuator being a pneumatic actuator.

A further embodiment of any of the foregoing embodiments may additionally and/or alternatively include the coupler allowing the mandrel to freely rotate.

A further embodiment of any of the foregoing embodiments may additionally and/or alternatively include the coupler comprising a spring-biased release sleeve having a first condition allowing a radial movement of locking members and a second condition blocking said movement.

A further embodiment of any of the foregoing embodiments may additionally and/or alternatively include the releasable coupler having at least one arm extending through a slot in the nosepiece to permit a user's hand to access the arm and use the arm to shift the release sleeve from the second condition to the first condition.

A further embodiment of any of the foregoing embodiments may additionally and/or alternatively include with the mandrel in the releasable coupler and the releasable coupler in its second condition, the mandrel can freely rotate about an axis of the apparatus.

A further embodiment of any of the foregoing embodiments may additionally and/or alternatively include a combination of the apparatus and a threaded insert. The threaded insert comprises: a body having an internal thread and an external thread and extending between a first rim and a second rim; and a plurality of keys having end portions axially protruding from the second rim. The anvil has a full annulus surface portion contacting the key end portions.

A further embodiment of any of the foregoing embodiments may additionally and/or alternatively include the insert having exactly two or exactly four said keys.

Another aspect of the disclosure involves an apparatus comprising: an actuator having a releasable coupler; a mandrel having a threaded first portion and a second portion received by the releasable coupler and freely rotatable about an axis; and an anvil surrounding the mandrel and coupled to the actuator so that the actuator may axially shift the mandrel relative to the anvil.

A further embodiment of any of the foregoing embodiments may additionally and/or alternatively include the coupler comprising a spring-biased release sleeve having a first condition allowing a radial movement of locking members and a second condition blocking said movement.

A further embodiment of any of the foregoing embodiments may additionally and/or alternatively include the releasable coupler having at least one arm extending through a slot in the actuator to permit a user's hand to access the arm and use the arm to shift the release sleeve from the second condition to the first condition.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
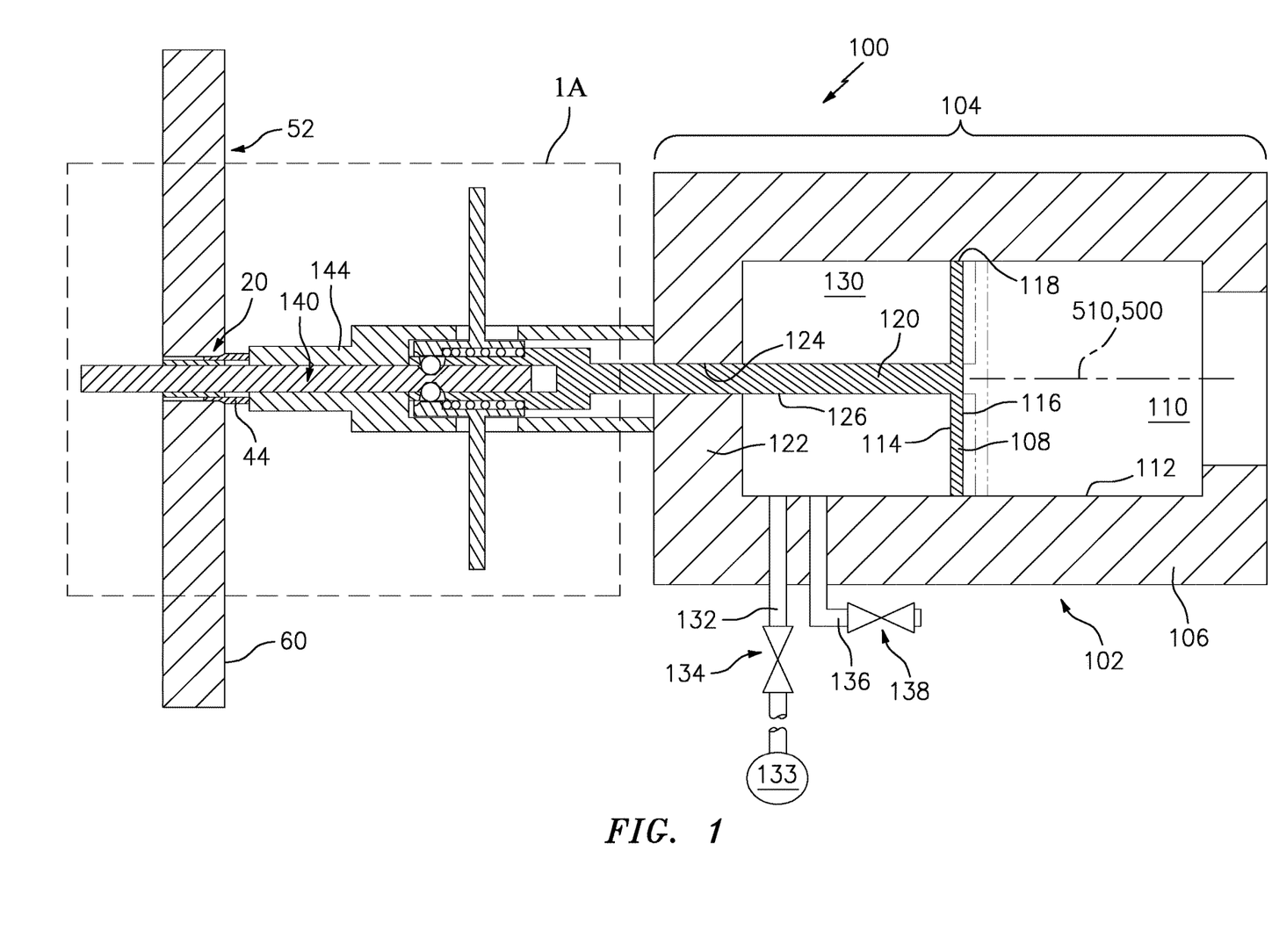
FIG. 1 is a central longitudinal sectional view of a key-driving tool immediately prior to driving keys into a key locked insert in a workpiece.

FIG. 1 shows a tool 100 for driving the keys 34 of key locked inserts 20. The tool 100 is illustrated in a condition engaged to an insert immediately before driving the keys 34. The exemplary tool 100 is a pneumatic tool with a pneumatic actuator (actuator or driving mechanism) 102. Exemplary actuators 102 include pneumatic mechanisms commonly used in pneumatic blind rivet installation tools (e.g., a commercial trigger-operated hand pneumatic rivet squeezer or similar). The tool 100 has a main body 104 containing a pneumatic cylinder (cylinder) 106 with a piston 108 mounted for reciprocal motion within a bore 110 surrounded by the cylinder ID wall 112. The cylinder 106 central longitudinal axis is labeled 510 in FIG. 1 and in the illustrated embodiment is coincident with the axis 500 of the insert and workpiece hole.

The piston 108 has first and second ends or faces 114 and 116 and a lateral or OD periphery 118. The periphery 118 may bear sealing rings to seal with the wall 112. A piston shaft or stem 120 extends from the end 114 in a direction that will be defined as forward. A forward wall 122 of the cylinder has a central aperture 124 sealed to the OD surface 126 of the shaft 120 (e.g., via o-rings carried in inwardly-open annular grooves (not shown) along the aperture 124).

This creates a sealed space 130 within the bore 110 forward of the piston 108. By admitting and withdrawing or venting pressurized fluid (e.g., air) from this space 130, the piston 108 may be actuated to move axially (respectively rearward and forward in the illustrated configuration). A relative rearward position is shown in broken line (for the piston 108 only and not for other components that would move with the piston).

FIG. 1 schematically shows a fluid supply line 132 (e.g., in communication with a supply 133 such as house pressurized air from a compressor—not shown) having a valve 134 and a venting or discharge line 136 having a valve 138. For a pneumatic actuator 102, the discharge line may be a vent to atmosphere and may, at an extreme, have essentially zero length. For a hydraulic actuator, the supply line may be from a pump or an accumulator of the hydraulic system and the discharge or return line may return to a reservoir of the hydraulic system—not shown). In other implementations, the valves 134 and 138 may be integrated. In a potential pistol grip actuator (not shown), a trigger may be coupled to the valves such that depressing the trigger closes the discharge valve 138 and opens the supply valve 134; whereas releasing the trigger closes the supply valve and opens the discharge valve.

Figure 1A:
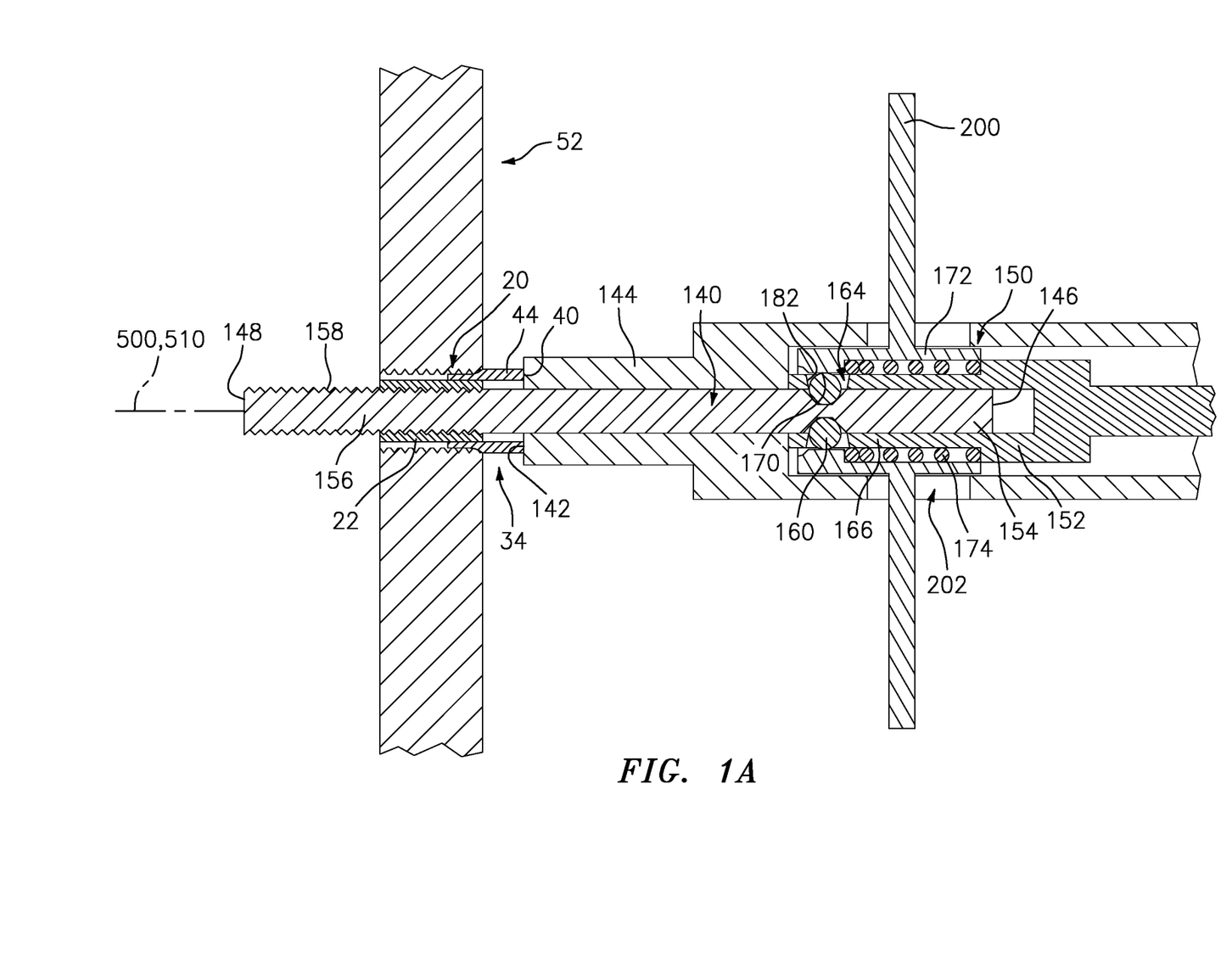
FIG. 1A is an enlarged view of a distal portion of the tool and the workpiece.

As is discussed further below, the piston 108 is mated to a mandrel 140 (FIG. 1A) which is threaded into the insert body 22 to axially secure the insert 20 relative to the piston. An exemplary mandrel 140 is formed of steel by lathe turning and then die threading. An anvil surface 142 is formed on a nosepiece 144 secured to the tool main body 104 of FIG. 1. The anvil surface 142 is dimensioned to contact the key distal ends 40. The exemplary anvil surface 142 is a full annulus so that it can equivalently contact the keys regardless of relative orientation about the axis 500 (thus decoupling relative orientation of the tool and key about the axis 500). The decoupling is further achieved by allowing the installed mandrel 140 to rotate about the axis 500 relative to the tool main body 104 (discussed further below).

Thus, admitting fluid to the space 130 (FIG. 1) will exert a rearward force on the piston 108 and a corresponding forward force on the cylinder forward wall 122. With the workpiece 52 held stationary, the forward force will drive the main body 104 forward and thus also drive the nosepiece 144 forward. Via this action, the nosepiece anvil surface 142 will drive the keys 34 from their initial extended conditions to inserted conditions (FIG. 4) in existing or newly-formed broached slots 56 as discussed above.

The mandrel (FIG. 1A) extends from a proximal end 146 to a distal end 148 (proximal viewed in this instance from the point of view of the tool to which the mandrel is mated). The mandrel 140 mates to the actuator via a coupler 150. The exemplary coupler is based on the configuration of a quick connect fluid coupler wherein: the female portion 152 of the coupler is mounted to the stem 120; while the male portion 154 is formed as a proximal end portion of the mandrel 140. The exemplary coupler 150 allows installation and removal of the mandrel without removing the nosepiece 144. A distal end portion 156 of the mandrel bears an external thread 158 complementary to the insert internal thread 28.

The exemplary coupler female portion includes a plurality of locking members (e.g., shown as metallic balls 160 (e.g., steel)) which, with the mandrel 140 in an installed and locked condition are partially accommodated in a groove 162 (FIG. 2) in the mandrel proximal portion. The balls 160 are also partially accommodated in associated radial holes 164 (FIG. 1A) in a body 166 of the female portion 152. In the locked condition, the ID surface 170 of a sleeve 172 of the coupler female portion 152 prevents radial outward movement of the balls 160. The sleeve 172 is biased into an extended position associated with the locked condition by a spring 174 (e.g., steel coil spring). When locked, an extractive axial force on the mandrel 140 causes a proximal face 180 (FIG. 2) of the groove 162 to bear against the balls 160 and then the balls to bear against distal ends 182 (FIG. 1A) of their associated holes 164. Outward movement of the balls 160 is prevented by the sleeve 172. The exemplary groove 162 is a full annulus and the mandrel proximal portion 154 of circular cross-section so as to have an unkeyed relationship to the coupler female portion 152. This unkeyed relationship allows the mandrel 140 to freely rotate about the axis 500, 510 relative to the tool main body 104 and nosepiece 144. This reduces the chance that rotating the tool main body 104 (e.g., a pistol grip or other handle) will rotate the mandrel 140 and, in turn, rotate the insert 20 away from its target orientation relative to the workpiece 52.

Figure 3:
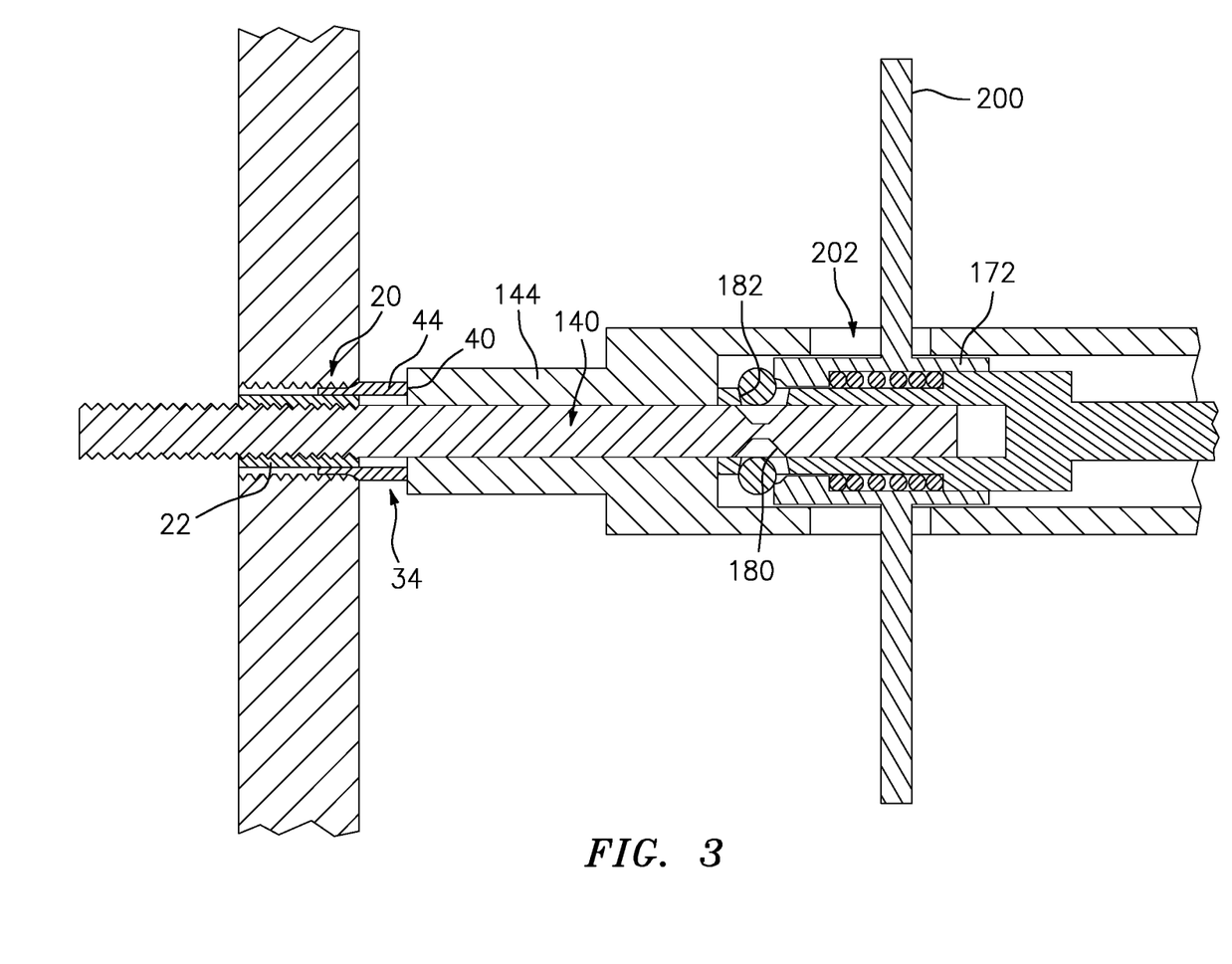
FIG. 3 is an enlarged central longitudinal sectional view of the distal portion the tool during installation of the mandrel to the tool.

Installation and release of the mandrel 140 may be accomplished by rearwardly shifting the sleeve 172 to a position clear of the balls 160 (e.g., with a downstream rim of the sleeve retracted rearward of the balls or by registering apertures (not shown) in the sleeve with the balls). FIG. 3 shows such a position, for example, during installation of the mandrel 140 before key driving. This sleeve retraction may be via one or more arms or levers 200 (two diametrically opposite arms shown), passing radially through respective slots 202 in the nosepiece 144. The user may grasp one or both levers 200 with one or two hands to pull the levers (and sleeve 172) toward the main body 104.

With the sleeve 172 so retracted, an extractive axial force (not shown) on the mandrel 140 causes the proximal face 180 of the groove 162 to bear against the balls 160 and then the balls to bear against distal ends 182 of their associated holes 164 and then be driven radially outward (at least by an amount of outward movement of the balls 160 no longer prevented by the sleeve 172). The amount of radial movement of the balls 160 is enough to let the balls slip out of the groove 162 and allow the mandrel 140 to be extracted. Mandrel insertion may be accomplished by a reverse process with the retracted sleeve 172 allowing the proximal end 146 of the mandrel to pass past the balls 160 until the balls register with the groove 162. Then, the retracted sleeve 172 may be returned via spring 174 bias to the locked condition.

Figure 2:
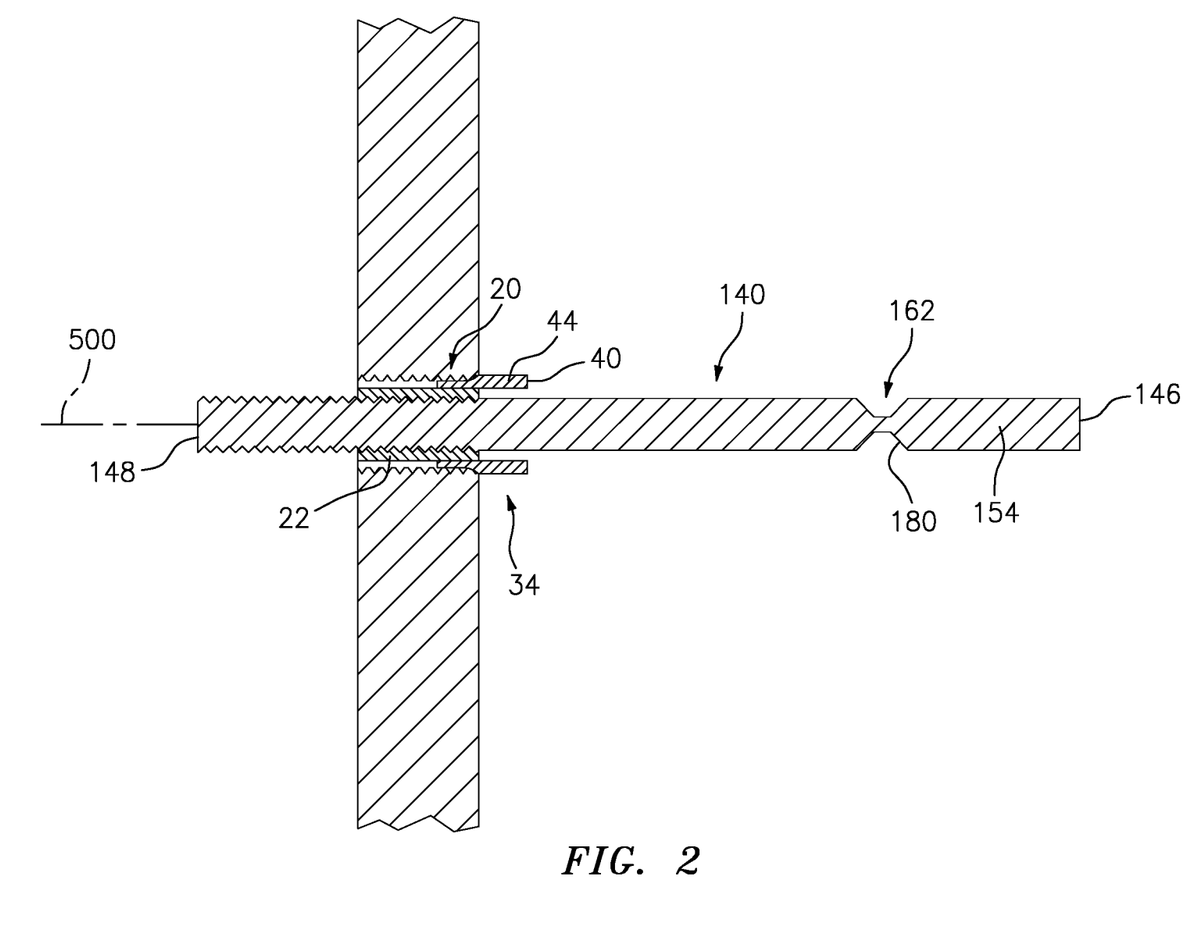
FIG. 2 is a central longitudinal sectional view of a mandrel of the tool installed to the insert in the workpiece.
Figure 4:
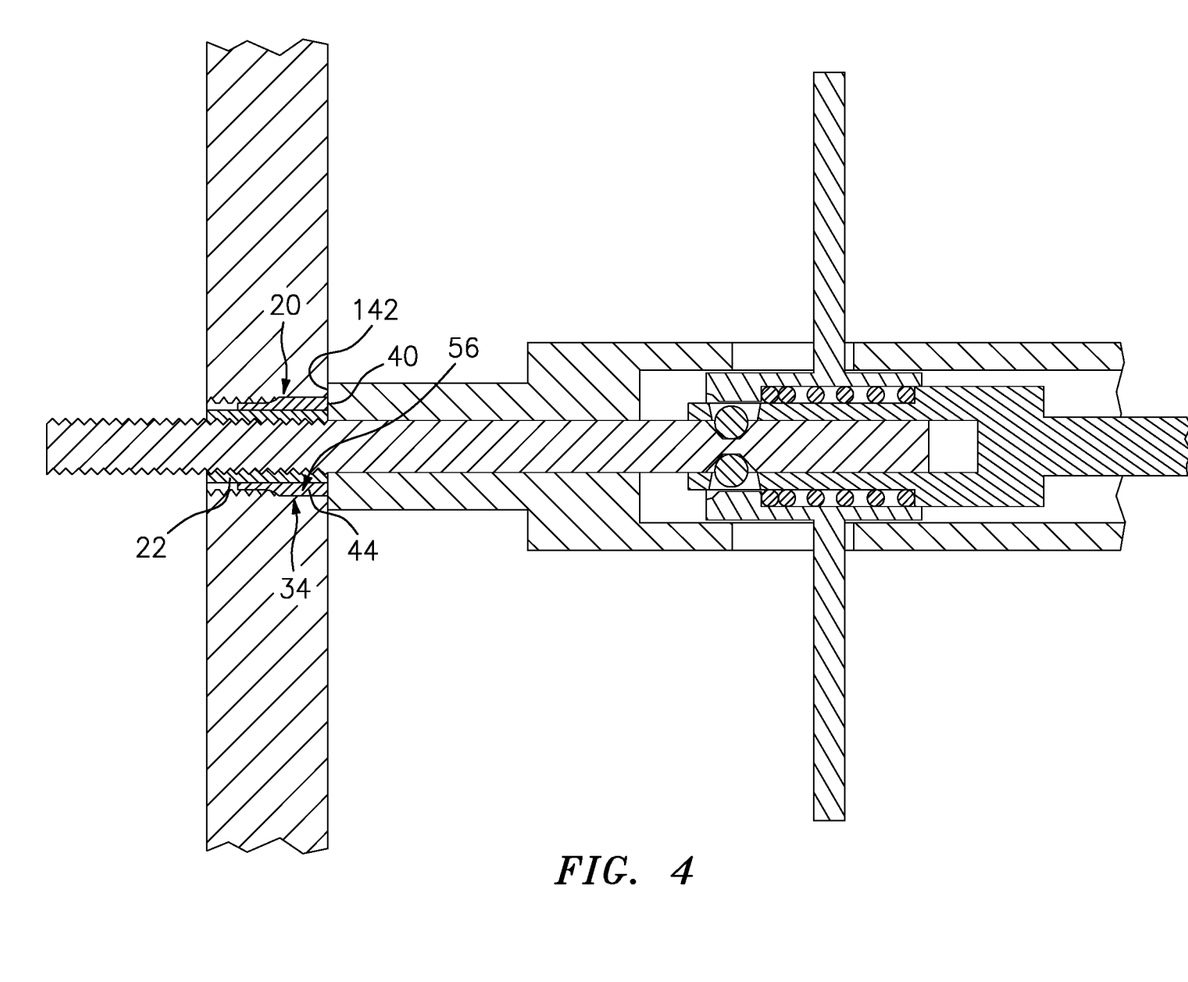
FIG. 4 is an enlarged central longitudinal sectional view of the distal portion of the tool upon key insertion.
Figure 5:
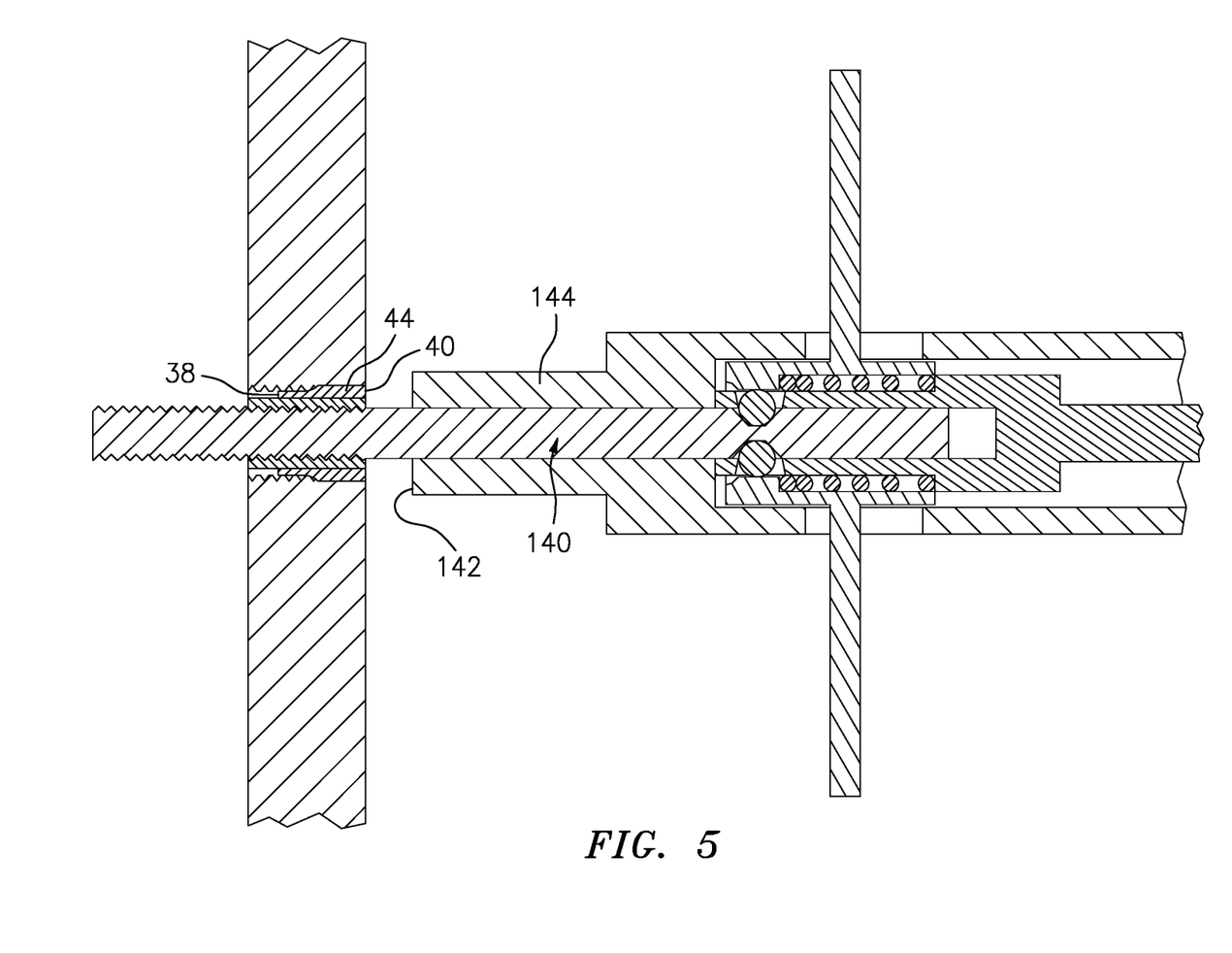
FIG. 5 is an enlarged central longitudinal sectional view of the distal portion of the tool after key insertion and reset of a tool piston.

In a use situation, the user manually threads the key locked insert 20 into the workpiece and stops with the body second end 26 just flush or slightly subflush to the surface 60 and the keys 34 in the desired clocking position (e.g., registered with existing slots 56 to be reused or at least the target angle θ (FIGS. 9 and 10) away from existing slots that are not to be re-used). The user threads the mandrel 140 (not yet attached to the coupler) into the ID thread 28 of the insert while maintaining the insert clocking position (FIG. 2). The user then installs the mandrel 140 to the coupler. Because the insert's clocking position is maintained, the operator actuates the driving mechanism 102 (e.g., via the valves(s) 134 and 138) which drives the keys 34 into the workpiece thread 54 in the desired position (FIG. 4). Inlet pressure is then secured via closing valve 134 and the remaining pressure is vented via opening valve 138 to allow for tool removal. FIG. 5 shows the tool having returned to an initial position. The user decouples the mandrel 140 from the tool via the release arms and extracts the tool, allowing the nosepiece 144 to pass over the mandrel. The user then manually unthreads the mandrel 140 from the insert 20.

In exemplary embodiments, the nosepiece 144 is easily removable from the main body such as via unscrewing about the axis or via a bayonet fitting or other interaction (not shown). This allows the provision of multiple sizes of nosepiece (each with one or more sizes of mandrel) to accommodate use with different sizes of insert.

Thus, unlike manual hammering, the key driving forces are counteracted via the tool such that mis-driving of the keys is avoided or reduced. Unlike existing pneumatic tools, the key clocking position can be set by the user.

Manufacture of the tool may be via existing techniques and using existing materials used for manufacturing pneumatic or other automated key-driving tools or rivet-driving tools. Although a pneumatic embodiment is principally discussed, other actuators such as hydraulic and electric (e.g., servomotor-driven worm gear) are possible.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in an unconnected claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when implemented via modifying an existing baseline tool configuration, details of such baseline may influence details of particular implementations. Accordingly, other embodiments are within the scope of the following claims.

What is claimed is:

1. A method for installing a key locked insert to a workpiece, the workpiece having a hole open to a first surface, the method comprising:
    threading an insert body into the hole;
    threading a first portion of a mandrel into the insert body;
    after the threading of the first portion into the insert body, mating a second portion of the mandrel with an actuator, the actuator having a releasable coupler receiving the second portion;
    using the actuator to extend an anvil on a nosepiece relative to the mandrel to drive keys of the insert through a thread of the hole; and
    releasing the mandrel from the coupler without removing the nosepiece from the actuator.

2. The method of claim 1 wherein:
the insert has exactly two or exactly four said keys.

3. The method of claim 1 wherein:
the driving of the keys creates slots through the thread of the hole.

4. The method of claim 1 wherein:
the threading of the insert body into the hole is before the threading of the first portion into the insert body.

5. The method of claim 4 wherein:
the actuator is a pneumatic actuator.

6. The method of claim 1 wherein:
the threading comprises registering the keys with existing slots through the thread of the hole.

7. The method of claim 1 wherein:
the threading comprises locating the keys away from existing slots through the thread of the hole.

8. The method of claim 1 wherein:
the mating of the second portion of the mandrel with the actuator comprises shifting a release sleeve against a spring bias to radially free locking members.

9. The method of claim 1 further comprising:
removing a prior keyed insert from the hole.

10. The method of claim 1 wherein:
the actuator is a pneumatic actuator.

11. The method of claim 1 wherein:
the coupler allows the mandrel to freely rotate.

12. The method of claim 1 wherein:
the releasable coupler comprises a spring-biased release sleeve having a first condition allowing a radial movement of locking members and a second condition blocking said movement.

13. The method of claim 12 wherein:
the releasable coupler has at least one arm extending through a slot in the nosepiece to permit a user's hand to access the arm and use the arm to shift the release sleeve from the second condition to the first condition.

14. The method of claim 12 wherein:
with the mandrel in the releasable coupler and the releasable coupler in the second condition, the mandrel can freely rotate about an axis of the apparatus.

15. The method of claim 1 wherein: the actuator is a pneumatic actuator.

16. The method of claim 1 wherein:
the anvil has a surface portion contacting end portions of the keys during the driving the keys through the thread of the hole.

17. The method of claim 1 wherein:
the mating leaves the mandrel freely rotatable about an axis; and
the anvil surrounds the mandrel and is coupled to the actuator so that the actuator may axially shift the mandrel relative to the anvil.

18. The method of claim 17 wherein:
the coupler comprises a spring-biased release sleeve having a first condition allowing a radial movement of locking members and a second condition blocking said movement.

19. The method of claim 18 wherein:
the releasable coupler has at least one arm extending through a slot in the actuator; and
a user's hand accesses the arm to use the arm to shift the release sleeve from the second condition to the first condition.

20. The method of claim 19 wherein:
at least one arm extends from the release sleeve through a slot in the actuator; and
the shifting of the release sleeve is via a user's hand using the at least one arm to shift the release sleeve.

* * * * *